United States Patent Office 3,514,469
Patented May 26, 1970

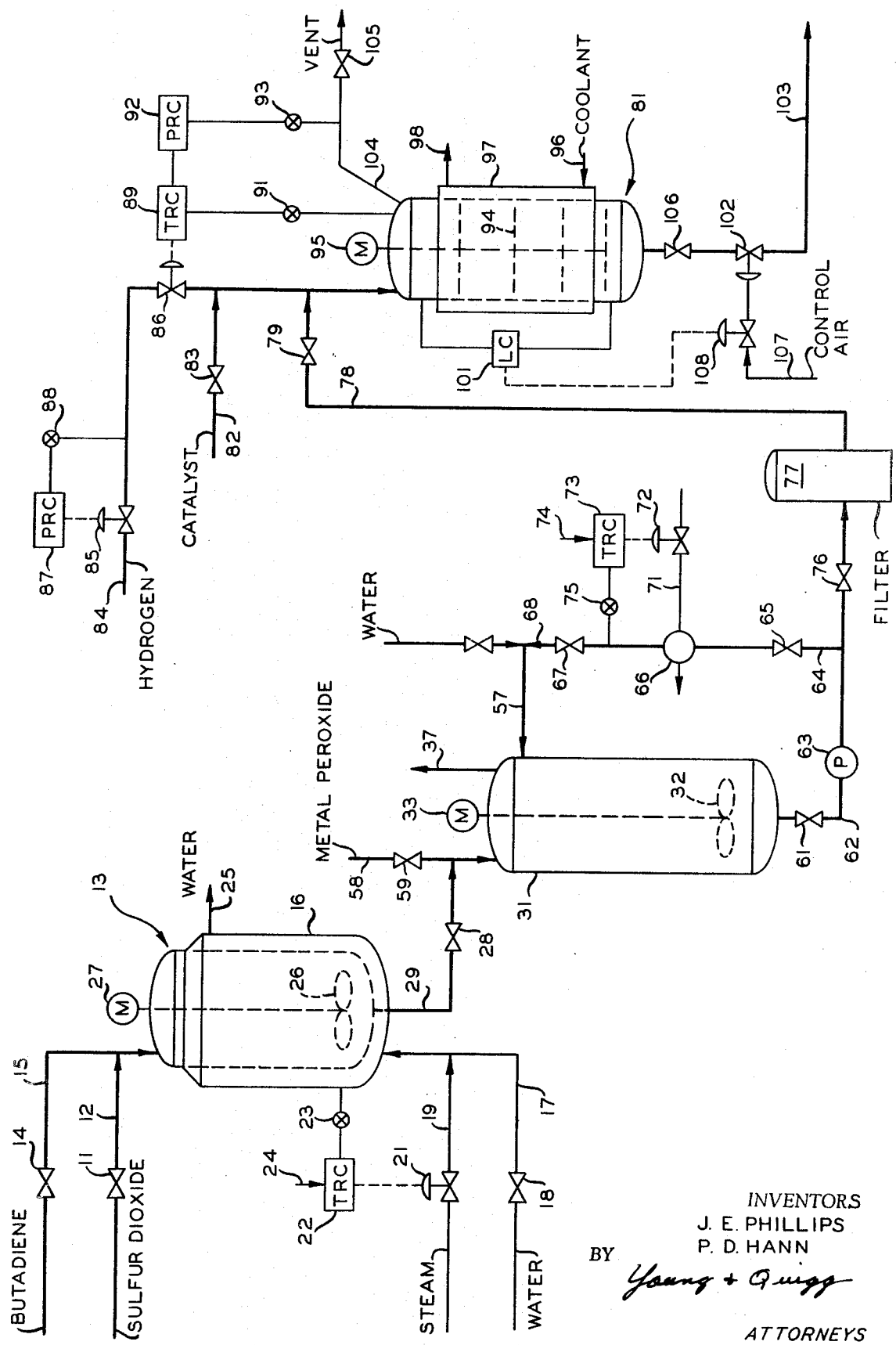

3,514,469
PRODUCTION OF SULFOLANE
Jack E. Phillips and Paul D. Hann, Bartlesville, Okla., assignors to Phillips Petroleum Company, a corporation of Delaware
Filed July 26, 1967, Ser. No. 656,122
Int. Cl. C07d 63/00
U.S. Cl. 260—332.1      10 Claims

ABSTRACT OF THE DISCLOSURE

Sulfur dioxide is reacted with a sulfolene precursor compound to form a sulfolene. A metal peroxide is added to oxidize excess sulfur dioxide and either neutralize or precipitate the resulting product. In the preferred embodiment either sodium, potassium or lithium peroxide is used so as to give a soluble sulfate salt with a neutral pH. The sulfolene compound, essentially free of sulfur dioxide, is then hydrogenated to form a sulfolane.

BACKGROUND OF THE INVENTION

This invention relates to the production of a sulfolene compound.

Sulfolanes are useful for a variety of purposes, such as in pesticidal compositions, intermediates in the production of other organic chemicals, and as selective solvents for various hydrocarbons, fatty acids, or fatty acid esters, and the like. For example, a sulfolane is added to a hydrocarbon mixture comprising aromatic and aliphatic components; two phases are formed, one being an aliphatic hydrocarbon phase and the other being a sulfolane phase containing the aromatic hydrocarbon; a simple phase separation then allows recovery of the aliphatic hydrocarbon.

Sulfolanes are generally prepared by reacting sulfur dioxide with a sulfolene precursor to form a sulfolene. The resulting sulfolene is then catalytically hydrogenated to form the sulfolane. Sulfur dioxide is always present after the formation of the sulfolene and it must be removed before the hydrogenation step since it acts as a catalyst poison. One method proposed in the prior art to accomplish this is to treat the sulfolene product with hydrogen peroxide to convert the sulfur dioxide to sulfur trioxide; this results in the formation of a dilute sulfuric acid solution which is also undesirable because of the corrosive nature of this acid. This procedure can be used, however, by then adding a base to neutralize the sulfuric acid. This is undesirable, however, since considerable amounts of time are required during these oxidation and neutralization operations in making the analyses and computations necessary to assure that the proper amount of base is added so that the final pH is in the desired range. Excess of base can catalyze the formation of methyl sulfonyl ether, an undesirable side product. Sulfur dioxide removal is further complicated by the fact that if appreciable heat is utilized in the removal process, sulfolene will be decomposed and sulfur dioxide will be generated as fast as it is removed.

SUMMARY OF THE INVENTION

It is an object of this invention to provide an improved process for the production of a sulfolane compound.

It is a further object of this invention to provide a process for the production of a sulfolane compound in which sulfur dioxide is removed from the sulfolene feed in a simple one-step operation.

In accordance with this invention, a metal peroxide is contacted with a sulfolene feed prior to hydrogenation to form a sulfolane.

BRIEF DESCRIPTION OF THE DRAWING

The drawing is a schematic flow diagram of a plant in accordance with the instant invention.

DESCRIPTION OF THE PREFERRED EMBODIMENTS

In the preferred embodiment, a metal peroxide is used which forms a salt with the resulting sulfate ion which is soluble in the hydrogenation solvent. Examples of such peroxides are Group I-A metal peroxides, e.g., lithium peroxide, $Li_2O_2$, sodium peroxide, $Na_2O_2$, and potassium peroxide, $K_2O_2$. These materials result in the conversion of the sulfur dioxide to sulfur trioxide and the immediate neutralization of the resulting acid to give the metal salt such as lithium sulfate, sodium sulfate, or potassium sulfate which is soluble in the preferred hydrogenation solvents such as water or aqueous alcohol solutions.

Peroxides of metals which form insoluble precipitates with the sulfate ions formed as a result of oxidizing the sulfur dioxide can also be used, in which case the effluent from this reaction is passed through a filter to remove the insoluble salt before being passed to the hydrogenation zone. A filter is sometimes provided anyway to remove any polymer which may have formed and the presence of the insoluble salt can act as a filter aid and actually improve the performance of the filter. Examples of suitable peroxides of metals which form insoluble precipitates in the preferred solvents are Group II-A metal peroxides e.g., calcium peroxide, $CaO_2$, strontium peroxide, $SrO_2$, and barium peroxide, $BaO_2$.

The term "a sulfolene" as employed herein and in the appended claims defines generically the unsubstituted and substituted unsaturated compounds comprising or containing a sulfolene nucleus, i.e., a 5-membered ring of four carbon atoms and a sulfur atom with a single olefinic linkage between two adjacent carbon atoms of said ring, and two oxygen atoms each of which is directly attached to said sulfur atom. Thus, the generic term "a sulfolene" covers the simple unsubstituted sulfolenes, viz., the 3-sulfolene having the general structure

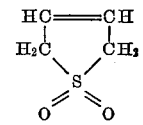

and the 2-sulfolene having the structure

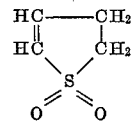

as well as the various substituted derivatives thereof, i.e., sulfolene compounds in which various organic and/or inorganic and particularly hydrocarbon radicals, i.e., alkyl, alkenyl, aryl, aralkyl, alkaryl, alicyclic and/or heterocyclic radicals, and/or such inorganic radicals as do not interfere with the hydrogenation reaction, are substituted for one or more of the hydrogen atoms of the above structures of the unsubstituted sulfolenes. In general the sulfolene molecule will contain a total of from 4 to 12 carbon atoms.

Similarly, the term "a sulfolane" as employed herein and in the appended claims refers to a saturated sulfolene compound which may be either unsubstituted or substituted. In other words, the sulfolane compound contains or consists of a saturated five-membered ring of four carbon atoms and a sulfur atom, the latter having two oxygen atoms directly attached thereto. The structural formula of the simple unsubstituted sulfolane, therefore, is

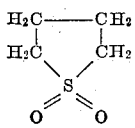

The generic term "a sulfolane" or "a sulfolane compound" covers not only the above compound but also the substituted derivatives thereof, particularly those in which various radicals mentioned in the preceding paragraphs are substituted for one or more of the hydrogen atoms of the above structure. Where such a radical is hydrogenatable under the conditions of the present process, it will be understood that the sulfolane containing the hydrogenated radical is included when reference is made to a sulfolane compound which "corresponds" to a given sulfolene compound. Thus, an alkyl sulfolane, such as a propyl or butyl sulfolane, corresponds to the alkenyl, such as allyl or butenyl, respectively, sulfolene.

The most widely used sulfolane compound is the material known as sulfolane, i.e., 2,3,4,5-tetrahydrothiophene-1,1-dioxide which is especially valuable as a selective solvent. Another especially widely used sulfolane compound is 2,4-dimethylsulfolane which also has been used as a selective solvent to separate aromatic hydrocarbons from petroleum fractions.

The sulfolene compounds can be prepared by reacting sulfur dioxide with at least one sulfolene precursor compound having the structural formula:

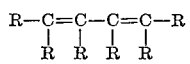

wherein each R is selected from the group consisting of hydrogen and various organic and/or inorganic radicals which do not interefere with the reaction to produce the sulfolene compound or the subsequent hydrogenation reaction to produce the corresponding sulfolane compound. Inorganic radicals which are suitable include the halogens, hydroxyl groups, and the like. A presently preferred class of starting materials comprises the conjugated diolefins of the structural formula indicated where each R is individually selected from the group consisting of hydrogen, alkyl, alkenyl, aryl, cycloalkyl and cycloalkenyl and combinations thereof such as aralkyl, alkaryl, and alkylcycloalkyl, where the total carbon content of the molecule is in the range of 4 to 12. Representative examples of the unsaturated organic compound include 1,3-butadiene, 2-methyl-1,3-butadiene (isoprene),
1,3-pentadiene (piperylene),
2,3-dimethyl-1,3-butadiene,
2,3-diethyl-1,3-butadiene,
2,3-ditertiary-butyl-1,3-butadiene,
2-tertiary-butyl-1,3-butadiene,
3,4-dimethyl-2,4-hexadiene,
3,4-diethyl-2,4-hexadiene,
2,4-dodecadiene,
2-methyl-1,3-pentadiene,
2-methyl-1,3-hexadiene,
2,4-dimethyl-2,4-hexadiene,
4-ethyl-1,3-hexadiene,
2-cyclopentyl-1,3-butadiene,
1-cyclopentyl-1,3-pentadiene,
1-cyclohexyl-1,3-butadiene,
1-(1-cyclohexene-1-yl)-1,3-butadiene,
2-phenyl-1,3-butadiene,
3-benzyl-1,3-pentadiene,
2-benzyl-1,3-butadiene,
3-p-tolyl-1,3-pentadiene,
2-m-tolyl-1,3-butadiene, and the like and their homologues and analogues. Also, suitable substituted derivatives of the above and like polyenes may be reacted with sulfur dioxide to form the desired mono-sulfones, examples of such substituted polyenes being 2-chloro-1,3-butadiene, 2-methyl-3-chloro-1,3-butadiene, 1-cyano-1,3-butadiene, and the like.

The instant invention is applicable to systems wherein the sulfolene feed is produced initially in the presence of a solvent, or where the sulfur dioxide is reacted with a sulfolene precursor in the absence of a solvent to produce a molten sulfolene compound which is thereafter introduced into a suitable hydrogenation solvent.

Referring now to the drawing, there is illustrated a diagrammatic representation of a process in accordance with one embodiment of the invention. For the sake of simplicity, the process will be described in terms of a batch process for the production of 2,3,4,5-tetrahydrothiophene 1,1-dioxide (known as sulfolane) from 1,3-butadiene and sulfur dioxide. Valve 11 in line 12 is opened to pass sulfur dioxide from a suitable source thereof into batch reactor 13. Valve 14 in line 15 is opened to pass 1,3-butadiene from a suitable source thereto into reactor 13. The butadiene and sulfur dioxide are reacted in reactor 13 in the absence of a solvent. The sulfur dioxide to butadiene mol ratio will generally be in the range of about 1:1 to about 1.6:1. While any suitable reaction temperature and pressure can be employed, the temperature in reactor 13 will generally be in the range of from about 100° F. to about 300° F., while the pressure in reactor 13 will generally be in the range of about 100 p.s.i.g. to about 600 p.s.i.g. In a presently preferred embodiment the sulfur dioxide is charged to reactor 13 at a temperature of approximately 140° F. After the sulfur dioxide is charged, the butadiene is added and the reactor temperature is permitted to rise slowly from the initiation temperature of about 140° F. to about 200° F. during the butadiene addition. After the butadiene addition is completed, the reactor contents are maintained at approximately 200° F. for a suitable time to permit substantial completion of the reaction. The temperature of reactor 13 is regulated by means of a heating jacket 16. Water is passed through line 17 and valve 18 into an inlet of jacket 16 while steam is injected into jacket 16 by way of line 19 containing valve 21. The valve 21 can be regulated by temperature recorder controller 22 responsive to a comparison of the actual temperature of the reactor contents as indicated by temperature sensor-transmitter 23 and the desired setpoint value 24. The water is withdrawn from heating jacket 16 by way of conduit 25. Agitation of the contents of reactor 13 can be provided by suitable means, such as stirrer 26 driven by motor 27. Suitable polymerization inhibitors, which can be added to reactor 13 separately or admixed with the butadiene, include pyrogallol, tert-butyl pyrocatechol, phenyl-β-naphthylamine, and the like. The amount of inhibitor will generally be in the range of from about 0.02 to about 1.0 weight percent based on the butadiene.

Upon the desired completion of the reaction, valve 28 in conduit 29 is opened to pass the molten reaction effluent from reactor 13 into treating vessel 31 which already contains a suitable hydrogenation solvent. Examples of such solvents include water, alcohols such as methanol, ethanol, isopropanol, and normal propanol, sulfolane, and admixtures of these solvents, and the like. Particularly suitable are water, aqueous methanol, aqueous ethanol, aqueous isopropanol, and aqueous normal propanol. In the process illustrated in the drawing, water is utilized. Addition water can then be added to vessel 31 through conduit 57. Agitation of the water and molten sulfolene can be provided by a suitable means, such as stirrer 32 driven by motor 33. The amount of solvent utilized is sufficient to provide a fluid solution and will generally be in the range of weight ratio of solvent to sulfolene of about 1:20 to 1:1.

A portion of the excess sulfur dioxide can be removed from the solution by a reduction of the pressure on the solution, for example, by flashing, stripping, pulling a vacuum, and the like. In the embodiment illustrated in the drawing, a vacuum is pulled on the water-sulfolene solution via line 37.

The temperature and pressure in tank 31 during the vacuum operation will generally be in the range of from about 75° to about 150° F. and about 5 p.s.i.a. to about 50 mm. Hg absolute. The vacuum treatment will generally reduce the sulfur dioxide concentration in vessel 31 to less than 1 weight percent.

After the vacuum treatment is concluded, additional water can be introduced into vessel 31 through conduit 57 as desired. The metal peroxide, for instance sodium peroxide, is introduced into vessel 31 by way of conduit 58 and valve 59 to chemically convert any remaining sulfur dioxide to sulfur trioxide and immediately neutralize the resulting acid to give the soluble metal salt, e.g., $Na_2SO_4$ ($NaHSO_4$ can be present).

A portion of the fluid contents of vessel 31 can be withdrawn therefrom during any or all of the venting, vacuum treating, and treating agent addition and passed through valve 61, conduit 62, pump 63, conduit 64, and valve 65 into and through indirect heat exchanger 66 wherein the fluid is heated. The thus heated fluid passes through valve 67 and conduits 68 and 57 into the vapor portion of vessel 31. The external heating circuit also provides greater agitation and admixing of the fluid components. The flow rate of the heat exchange fluid in conduit 71 can be regulated by valve 72 responsive to a comparison by temperature recorder controller 73 of the desired temperature setpoint 74 with the actual temperature of the fluid in conduit 68 as indicated by temperature sensor-transmitter 75. Heat exchanger 66 and its associated controls can be omitted, if desired, and the loop utilized just for mixing.

After the treatment is completed, the fluid contents of vessel 31 are withdrawn by way of valve 61, conduit 62, and passed by pump 63 through valve 76 into and through filter 77 to remove any polymer which may have formed and any other insoluble material. When operating in accordance with this preferred embodiment, the sulfate salts are in solution and are not removed by this filter; thus it would be possible in cases where polymer formation was essentially eliminated to omit this filter. When utilizing metal peroxides which form salts which are insoluble in the hydrogenation solvent, these salts will be removed by this filter. The filtered solution of the sulfolene compound in water is then passed through conduit 78 and valve 79 into hydrogenation reactor 81. A suitable hydrogenation catalyst is introduced into reactor 81 by way of conduit 82 and valve 83. Suitable catalysts include any of those known in the art to be useful in the catalytic hydrogenation of sulfolenes to sulfolanes. A preferred class of hydrogenation catalysts is that which comprises the metal hydrogenation catalysts, such as those containing or consisting of nickel, cobalt, copper, platinum, palladium, or mixtures of these metals with themselves or with other metals such as iron, zinc, chromium, cadmium, etc. These metals may be used in finely divided form such as, for example, Raney nickel, or may be suitably supported on a support such as kieselguhr, aluminum oxide, diatomaceous earth, and the like. These catalysts can be prepared in any suitable manner, and a discussion of such preparation will be omitted in the interest of brevity. The amount of catalyst utilized will vary with the catalyst but will generally be in the range of about 1 to about 5 weight percent based on the sulfolene charged.

Hydrogen is introduced into reactor 81 by way of conduit 84 and valves 85 and 86. Valve 85 can be manipulated by pressure recorder controller 87 to maintain the hydrogen pressure in conduit 84 downstream of valve 85, as indicated by pressure sensor-transmitter 88, substantially constant. The amount of hydrogen utilized is sufficient to provide the desired hydrogenation pressure and will generally be in the range of about 10 p.s.i.g. to about 2000 p.s.i.g., preferably 50 p.s.i.g. to 500 p.s.i.g.

The reaction temperatures and pressures can vary over wide ranges. In fact, any temperature is operable at which the reaction mixture is liquid, and which is below that at which the materials decompose. In order to avoid any substantial thermal decomposition, it is preferred to operate below about 125° F., preferably in the range from about 50 to 120° F. Hydrogenation proceeds at hydrogen pressure above 5 pounds per square inch gauge and is effected quite rapidly and smoothly at 500 to 1500 pounds per square inch gauge. Pressures above this range can be employed if desired.

As the hydrogenation reaction is exothermic, valve 86 in conduit 84 can be manipulated by temperature recorder controller 89 responsive to a comparison of a desired temperature setpoint and the actual temperature in reactor 81, as indicated by temperature sensor-transmitter 91, to maintain the temperature in reactor 81 within a desired range. The pressure in reactor 81 can be maintained in the desired range by utilizing pressure recorder controller 92 to manipulate the temperature setpoint of controller 89 responsive to the pressure in reactor 81 as indicated by pressure sensor-transmitter 93. Agitation of the fluid contents of reactor 81 can be provided by stirrer 94 driven by motor 95. A coolant can be passed through conduit 96 into and through jacket 97 to aid in maintaining the temperature in reactor 81 in the desired range. Used coolant is removed through conduit 98.

Following completion of the hydrogenation reaction, the sulfolane product can be recovered by conventional procedures. Generally this comprises first cooling the reaction mixture, venting gases therefrom, filtering the cooled reaction mixture to remove catalyst, and fractionating the filtered reaction mixture to remove solvent and unreacted sulfolene.

Liquid level controller 101 actuates control of valve 108 located in the fluid actuating conduit 107 which passes control fluid to valve 102 in outlet conduit 103. Valve 106 is opened to remove the batch of hydrogenated material from reactor 81 upon completion of the reaction therein. In order to ensure that the reactor outlet 103 is not accidentally left open during filling with the next batch, the level controller 101 senses the low level in reactor 81 and overrides the control fluid actuating valve 108 to close valve 102 in conduit 103.

Also, vent valve 105 in conduit 104 can be used to vent reactor 81.

The amount of metal peroxide used will vary depending on the amount of excess sulfur dioxide and on whether a vacuum removal step for the sulfur dioxide is used. It is desirable to use as nearly as possible a stoichiometric amount of the peroxide although, since even traces of sulfur dioxide poison the hydrogenation catalyst, a slight excess of peroxide is preferred to having a slight amount of sulfur dioxide remain. In the preferred embodiment where solvents such as water or aqueous alcohol are used and the peroxide is a peroxide of a metal which forms a soluble salt, an excess of the peroxide will result in the formation of an alkaline solution and the amount of peroxide can be adjusted to give a pH in the range of 6.5 to 8.5. Generally from about 0.9 to 1.2, preferably 1.0 to 1.1, moles of peroxide per mole of sulfur dioxide is used.

EXAMPLE

In an apparatus such as that shown in the drawing, 500 pounds of sulfolene containing 0.10 weight percent residual sulfur dioxide is produced. This sulfolene is introduced into a treating vessel containing water as the hydrogenation solvent, 0.61 pound of sodium peroxide is added and the mixture is agitated. The sulfur dioxide is converted to sodium sulfate. The sulfolene, water and sodium sulfate are transferred to a hydrogenation reactor where it is converted to sulfolane. The product is recovered and purified to give 470 pounds of sulfolane (94 percent conversion).

What is claimed is:

1. A process for the removal of excess sulfur dioxide from a solution of a sulfolene compound in a solvent which comprises: contacting said solution with a Group I–A or II–A metal peroxide treating agent, said metal peroxide being present in an amount sufficient to convert at least a portion of said sulfur dioxide to the corresponding sulfate salt.

2. A process in accordance with claim 1 wherein said sulfolene compound is produced by contacting sulfur dioxide with a sulfolene precursor compound under suitable reaction conditions to cause the production of said sulfolene compound, and sulfolene precursor having the structural formula:

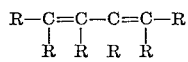

where each R is individually selected from the group consisting of hydrogen and organic and inorganic radicals which do not interfere with the reaction to produce the sulfolene compound or the hydrogenation of the sulfolene compound to produce the corresponding sulfolane compound.

3. A process in accordance with the claim 2 wherein the reaction of the sulfur dioxide and the sulfolene precursor is conducted in the absence of a solvent, the resulting molten reaction effluent is contacted with a suitable solvent therefor, said solvent also being suitable as the solvent for the hydrogenation of the sulfolene compound to the corresponding sulfolane compound, further comprising subjecting the resulting solution to a partial vacuum to remove a portion of any unreacted sulfur dioxide contained in said molten reaction effluent prior to the addition of said treating agent.

4. A process in accordance with claim 2 wherein each said R is individually selected from the group consisting of hydrogen, alkyl, alkenyl, aryl, aralkyl, alkaryl and alicyclic radicals with the total carbon content of said precursor compound being in the range of 4 to 12.

5. A process according to claim 2 wherein said solvent is selected from the group consisting of water, aqueous methanol, aqueous ethanol, aqueous isopropanol, aqueous normal propanol, and mixtures thereof, and said metal peroxide is selected from the group consisting of lithium peroxide, sodium peroxide, and potassium peroxide.

6. A process according to claim 2 wherein said solvent is selected from the group consisting of water, aqueous methanol, aqueous ethanol, aqueous isopropanol, aqueous normal propanol, and mixtures thereof, said metal peroxide is selected from the group consisting of calcium peroxide, strontium peroxide, and barium peroxide, said process further comprising filtering the solution to which said peroxide has been added to remove at least a portion of the resulting insoluble sulfate and any insoluble polymer.

7. A process according to claim 2 further comprising contacting said sulfolene compound with hydrogen in the presence of a suitable hydrogenation catalyst under hydrogenation conditions to convert the sulfolene compound in the solution to the corresponding sulfolane compound.

8. A process according to claim 7 wherein said precursor is butadiene, said solvent is water, said peroxide is sodium peroxide, and said sulfolane compound is 2,3,4,5-tetrahydrothiophene-1,1-dioxide.

9. A process according to claim 7 wherein the mole ratio of said peroxide to said sulfur dioxide is between about 1.0:1 and 1.1:1.

10. A process according to claim 7 wherein said solvent is selected from the group consisting of water and aqueous alcohol, said sulfate salt is soluble in said solvent, and said metal peroxide is present in an amount sufficient to give said solution a pH in the range of 6.5 to 8.5.

References Cited

UNITED STATES PATENTS 2,922,826  1/1960  Johnson _____ 260—655

HENRY R. JILES, Primary Examiner

C. M. SHURKO, Assistant Examiner

U.S. Cl. X.R.
23—49, 121, 122